(12) United States Patent
Beck

(10) Patent No.: US 9,755,745 B2
(45) Date of Patent: Sep. 5, 2017

(54) DEVICE FOR SIMULTANEOUS DATA AND POWER TRANSMISSION OVER AN OPTICAL WAVEGUIDE

(71) Applicant: SIEMENS AKTIENGESELLSCHAFT, Munich (DE)

(72) Inventor: Michael Beck, Winkelhaid (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/030,122

(22) PCT Filed: Oct. 18, 2013

(86) PCT No.: PCT/EP2013/071847
§ 371 (c)(1),
(2) Date: Apr. 18, 2016

(87) PCT Pub. No.: WO2015/055250
PCT Pub. Date: Apr. 23, 2015

(65) Prior Publication Data
US 2016/0269114 A1  Sep. 15, 2016

(51) Int. Cl.
*H04J 14/02* (2006.01)
*H04B 10/25* (2013.01)
(Continued)

(52) U.S. Cl.
CPC ....... *H04B 10/2504* (2013.01); *G02B 6/4296* (2013.01); *H04B 10/503* (2013.01);
(Continued)

(58) Field of Classification Search
CPC .. H04B 10/2504; H04B 10/503; H04B 10/66; H04B 10/807; G02B 6/4296; H04J 14/02; H04J 14/0279; H04L 5/14
(Continued)

(56) References Cited

U.S. PATENT DOCUMENTS 5,796,890 A     8/1998  Tsuji et al.
6,208,456 B1 *  3/2001  Lawrence ............... H01S 3/063
                                                      359/333
(Continued)

FOREIGN PATENT DOCUMENTS

CN      103199927 A    7/2013
RU      118142 U1      7/2012

OTHER PUBLICATIONS

Banwell, Thomas, et al.; "Powering the fiber loop optically—A cost analysis"; Journal of Lightwave technology, IEEE Service Center; vol. 11; No. 3; pp. 481-494; ISSN: 0733-8724; DOI: 10.1109/50. 219583; XP000372715; 1993.

*Primary Examiner* — Ken N Vanderpuye
*Assistant Examiner* — Abbas H Alagheband
(74) *Attorney, Agent, or Firm* — Laurence Greenberg; Werner Stemer; Ralph Locher

(57) ABSTRACT

A device and a method for simultaneous full-duplex data and power transmission over a single optical waveguide, which connects a base station and a remote station. At the base station a high power laser source emits a first laser beam for carrying power and a base station low power laser source emits a second laser beam for carrying data over the optical waveguide from the base station to the remote station. An optical interface couples the laser beams into the optical waveguide. The laser beams are received at corresponding first and second remote station optical receivers. At the remote station, a third laser beam is emitted by a remote station low power laser source for carrying data from the remote station to the base station and the beam is received at the base station optical receiver. The wavelengths of the first, second and the third laser beams are distinct.

13 Claims, 3 Drawing Sheets

(51) Int. Cl.
  *H04B 10/80* (2013.01)
  *G02B 6/42* (2006.01)
  *H04B 10/50* (2013.01)
  *H04B 10/66* (2013.01)
  *H04L 5/14* (2006.01)

(52) U.S. Cl.
  CPC ........... *H04B 10/66* (2013.01); *H04B 10/807* (2013.01); *H04J 14/02* (2013.01); *H04L 5/14* (2013.01); *H04J 14/0279* (2013.01)

(58) Field of Classification Search
  USPC ......................................................... 398/79
  See application file for complete search history.

(56) References Cited

U.S. PATENT DOCUMENTS

| | | | | |
|---|---|---|---|---|
| 6,236,669 | B1* | 5/2001 | Nakanishi | G02B 6/4246 372/43.01 |
| 6,374,021 | B1* | 4/2002 | Nakanishi | G02B 6/4246 385/49 |
| 7,844,154 | B2 | 11/2010 | Bookbinder et al. | |
| 7,941,022 | B1* | 5/2011 | Schaffner | G02B 6/03633 385/123 |
| 8,180,225 | B2* | 5/2012 | Werthen | G06F 13/385 398/135 |
| 8,472,764 | B2* | 6/2013 | Chan | H02J 17/00 250/551 |
| 8,532,497 | B2* | 9/2013 | Chan | H04B 10/807 398/118 |
| 8,600,241 | B2* | 12/2013 | Chan | H04B 10/807 250/216 |
| 8,660,435 | B2* | 2/2014 | Chan | H04B 10/807 398/171 |
| 8,842,995 | B2* | 9/2014 | Chan | H04B 10/807 398/118 |
| 8,971,722 | B2* | 3/2015 | Chan | H04B 10/807 398/162 |
| 9,197,329 | B2* | 11/2015 | Chan | H04B 10/807 |
| 2002/0021872 | A1 | 2/2002 | Althaus et al. | |
| 2003/0156792 | A1* | 8/2003 | Lawrence | G02B 6/42 385/39 |
| 2005/0265410 | A1* | 12/2005 | Cho | H01S 5/02212 372/36 |
| 2008/0235418 | A1* | 9/2008 | Werthen | H04B 10/807 710/106 |
| 2013/0051024 | A1* | 2/2013 | Amit | H04B 10/40 362/259 |
| 2014/0270778 | A1* | 9/2014 | Hui | H04B 10/2503 398/79 |

\* cited by examiner

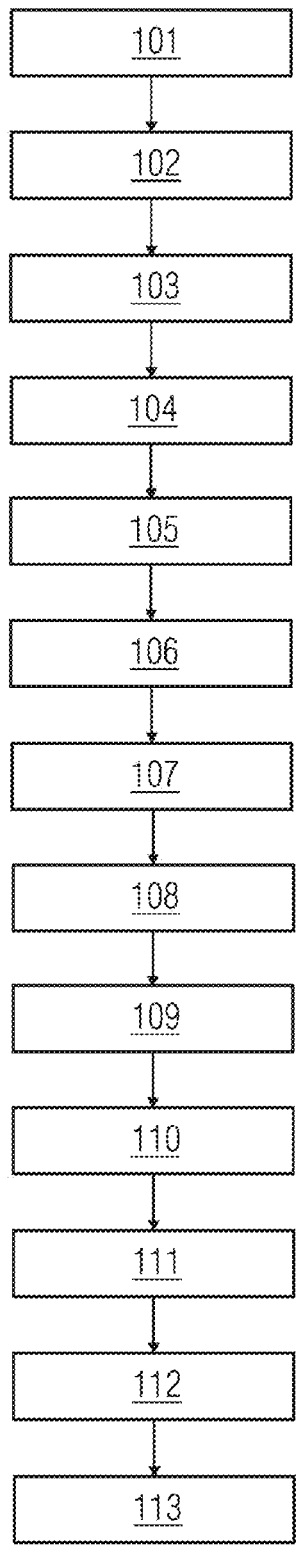

DEVICE FOR SIMULTANEOUS DATA AND POWER TRANSMISSION OVER AN OPTICAL WAVEGUIDE

BACKGROUND OF THE INVENTION

Field of the Invention

The present invention relates to optical fibre communication and power transmission and more particularly to a device for full duplex data transmission and power transmission simultaneously over an optical waveguide between a base station and a remote station.

Data communication through optical fibre cables is very well-known and is being practised for a long time now. Optical power transmission through fibre optics has been known for many years now in high voltage direct current (HVDC) technology and is gaining more and more popularity due to the numerous advantages it offers. Fibre-provided electrical power has the advantage of providing total immunity from electrical noise and provides complete isolation of the source and the system.

Simultaneous data and power communication over optical fibre cables requires huge quantities of cables, i.e. a cable for transmitting data, a cable for receiving data and a separate cable for transmitting power. In these systems, for the bidirectional data communication through a single optical wave guide, duplex-modules are used. These modules contain a sending diode and a receiving photodiode and each of these normally operate at a different wavelength. The power is supplied to electronic modules through an additional optical wave guide. For this, light is coupled into an optical waveguide by a high-power-laser. The light is then converted back into electrical energy in the electronic module, with the help of a photovoltaic converter. Such modules are used, for instance, for measuring the current and voltage at high voltage potential. In the same way, besides the measurement modules, gap trigger modules at high voltage potential are also used, which are required for igniting arc paths or gaps.

Furthermore, duplex modules are also available for medical technology applications which are equipped with two lasers of different power or wavelength and which also couple into a single optical wave guide.

The advantages of using optical fibre cables are widely known. Use of optical fibre cables for transmission result in low transmission loss and no crosstalk and makes a wider bandwidth available for use. They provide signal security, electrical isolation and provide immunity to interference. Moreover, optical fibre cables are small in size and weight, and the raw materials are abundantly available. These are only some of the advantages of using optical fibre cables for data and power transmission.

However, when using duplex modules as mentioned earlier for data transmission, a separate optical wave guide is being used for transmission of power along with data. This increases the cost of transmission as extra raw material is required for the additional cable for power transmission. Also the installation cost increases.

U.S. Pat. No. 7,844,154 discloses a special cable where the data and power transmission can take place through a single optical waveguide. This cable removes the need for using a separate cable for transmitting power in a system for data transmission. This patent discloses an optical fibre adapted to carry optical power for powering an electrical device and also optionally adapted to carry optical data for signal processing. The optical fibre capable of carrying both optical data and optical power includes a central data waveguide region that carries data light and an annular power waveguide region concentrically surrounding the data waveguide region and adapted to carry relatively large amounts of optical power.

However, the above disclosed invention requires a special structural change made to the ordinary optical fibre cable which includes making different coaxial channels for transmitting power and data separately through the same cable.

Therefore, a need exists for a device which transmits power and data simultaneously over a single optical waveguide without having to make any structural changes to the existing optical waveguide.

BRIEF SUMMARY OF THE INVENTION

It is an object of the present invention to provide for a cost efficient device for simultaneously transmitting data and power over a single optical waveguide without changing the structure of the existing optical waveguide.

The object of integrating full-duplex data transmission with simultaneous power transmission over the same optical waveguide is achieved by transmitting data at one wavelength, receiving data at another wavelength and transmitting power over a third different wavelength using triplex modules.

The proposed solution overcomes the need for laying down additional fibre cables for power transmission or making structural changes to ordinary optical waveguides for transmitting power. Since the transfer of data and the power supply to electronic modules with laser light takes place through one single optical wave guide by use of triplex modules, this results in saving of raw material from which optical wave guide is made up of and it also leads to saving of commissioning costs for laying down the optical waveguides as only a single waveguide can provide the desired result.

The existing method for data transmission through the laser channel, especially the uplink transmission from the base station to a remote station, is prone to errors, since the data transfer also has to realize the power supply of the module at the same time, in other words, the power supply of the module is achieved via the data transfer. In case the system of triplex modules as disclosed in the present invention is used, the data transfer and the power supply through laser light happens totally independent of each other. As a result, greater reliability of transmission of and installation can be expected.

The invention discloses a device and a method for simultaneous full-duplex data and power transmission over a single optical waveguide using triplex modules. In this device, an optical waveguide connects a base station and a remote station.

At the base station a high power laser source or a high power laser source emits a first laser beam for carrying power and a low power laser source, for example a low power laser diode, emits a second laser beam for carrying data from the base station to the remote station over the optical waveguide. The optical interface couples the laser beams into the optical waveguide for transmission. The first and second laser beams are received at the corresponding first and second remote station optical receivers. Similarly at the remote station, a third laser beam is emitted by a low power laser source, for example a low power laser diode, for carrying data from the remote station to the base station and this beam is received at the base station optical receiver. The wavelengths of the first, second and the third laser beams are distinct.

The invention discloses a device for simultaneous data and power transmission over an optical waveguide between a base station and a remote station. The data transmission is a full-duplex two way transmission. The device comprises of the base station, the remote station and the optical waveguide which connects the base station to the remote station. The base station is for transmitting and receiving data and for power transmission over the optical waveguide. The base station comprises a high power laser source for emitting a first laser beam at a first wavelength, a low power laser source, such as a low power laser diode, for emitting a second laser beam at a second wavelength and a base station optical receiver for receiving a third laser beam at a third wavelength from the remote station. The first laser beam is used for power transmission from the base station to the remote station, the second laser beam is used for data transmission from the base station to the remote station and the third laser beam is used for data transmission from the remote station to the base station. The device further comprises a base station optical interface for simultaneously coupling the first and the second laser beams into the optical waveguide and for directing the third laser beam from the optical waveguide to the base station optical receiver.

The remote station is for receiving and transmitting data and for receiving the power over the optical waveguide from the base station. The remote station also comprises a low power laser source, such as a low power laser diode, for generating at least the third laser beam for data transmission from the remote station to the base station, a first remote station optical receiver for receiving the first laser beam from the base station, a second remote station optical receiver for receiving the second laser beam from the base station. The device further comprises a remote station optical interface for simultaneously directing the first laser beam to the first remote station optical receiver, the second laser beam to the second remote station optical receiver, and for coupling the third laser beam into the optical waveguide.

In the device the first, the second and the third wavelengths of the first, the second and the third laser beams respectively are distinct from each other. The devices for power transmission from the base station to the remote station, i.e. the high power laser source acting as the power transmitter and the first remote station optical receiver, operate at the first wavelength. The devices for data transmission from the base station to the remote station, i.e. the low power laser diode at the base station acting as the uplink data transmitter and the second remote station optical receiver, operate at the second wavelength. The devices for downlink data transmission from the remote station to the base station, i.e. the low power laser diode at the remote station acting as the downlink data transmitter and the base station optical receiver, operate at the third wavelength.

The properties of laser beams like narrow spectral width, high intensity, high degree of directivity and coherence make it the best choice for these applications.

An example of the optical waveguide used in the device is a multi mode 62.5/125 or 105/125 µm fibre cables.

In another embodiment the first remote station optical receiver comprises a photovoltaic power converter (PPC) for converting the power received from the first laser beam into electrical energy. The power is transmitted as light via the first laser beam through the optical waveguide and the power is received at the remote station. The PPC receives the power from the laser beam and converts the light energy into electrical energy. In example of a PPC is PPC-6E, which is a photovoltaic power converter optimized for maximum efficiency in the range of 790-850 nm illumination. It is designed to convert 790-850 nm light into electrical power up to 6 V, with output power from a few mW to 0.5 W. The PPC-6E is available with ST or FC connectors. It offers complete electrical isolation. The PPC-6E is optimized for 810 nm light source.

The power transmitted over the optical waveguide is supplied to an electronic module at high voltage at the remote station. Examples of electronic modules are measurement modules, gap trigger modules etc. Such modules are used, for instance, for measuring the current and voltage at high voltage potential. In the same way, besides the measurement modules, gap trigger modules at high voltage potential are used, which are required for igniting arc paths or gaps.

Thus with the additional high-power laser diode or photovoltaic element, respectively, power is supplied to electronic modules, assemblies, boards etc. at high voltage with a single optical wave guide, or in other words a light waveguide, an optical fibre etc.

In another embodiment of the device, the base station optical receiver, the first remote station optical receiver and the second remote station optical receiver are photodiodes. The photodiodes are semiconductor based photo-detectors capable of converting the light coming from the first, the second and the third laser beams into either current or voltage. These photodiodes can sense the luminescent power of the laser beams falling upon it and convert this optical power into a corresponding electric current. These photodiodes are used exclusively because of their small size, suitable material, high sensitivity, and fast response time.

In a further embodiment, the low power laser sources, i.e. the low power laser source at the base station and/or the low power laser source at the remote station are laser diodes. In a further embodiment these laser diodes are of the type vertical-cavity surface-emitting laser (VCSEL). A VCSEL is a semiconductor laser diode whose laser beam emission is perpendicular from the top surface, contrary to conventional edge-emitting semiconductor lasers. Use of VCSEL would make the construction of the device simpler by providing the laser beam in a particular direction as desired.

In yet another embodiment, the high power laser source has a heat sink connected to it for dissipating heat from the high power laser source. The high power laser source radiates huge amounts of heat as it generates power of the order of 1.5 W or more. To dissipate this excess heat sinks are required. The heat sink keeps the temperature of the base station low. The low power laser sources do not radiate as much heat and hence do not necessarily require any heat sinks.

However, it is not mandatory to use a heat sink since the power dissipation depends on the required laser power and duty cycle. In case if cooling is required, for example in case of high power or high duty cycle, any kind of cooling could be used, namely passive cooling, for example using heat sinks, or active cooling, for example using cooling fans.

In a further embodiment the base station low power laser source, the base station optical receiver, the base station optical interface and the high power laser source are arranged inside a base station housing. This housing together forms a base station triplex module. This 'integrated version' of the device gives the device a compact structure and makes it more portable.

In another embodiment the base station low power laser source, the base station optical interface and the base station optical receiver together form a base station triplex module arranged inside a base station housing. The high power laser source is connected to the base station triplex module via a first permanent link with a waveguide for feeding the first laser beam into the base station triplex module. This permanent link with a waveguide can be made of fibre pigtail. This 'pigtail version' of the configuration of connecting the high power laser source as an external attachment to the base station triplex module has an advantage. The high power laser source radiates a lot of heat as it produces power of the order of 1.5 W or more. To dissipate this heat sink has to be installed. The heat sink would occupy a considerable amount of space. Having the high power laser source as a separate module connected to the base station triplex module via a permanent link with a waveguide will reduce the size of the base station triplex module as the high power laser module along with the heat sink is outside the triplex module and forms a separate external unit. It will make the device more flexible so that it can be easily accommodated into larger systems.

In another embodiment the remote station low power laser source, the remote station optical interface, the first remote station optical receiver and the second remote station optical receiver are arranged inside a remote station housing. This housing together forms a remote station triplex module. This integrated version gives the device a compact structure and makes it more portable.

In yet another embodiment the remote station low power laser source, the remote station optical interface and the second remote station optical receiver together form a remote station triplex module arranged inside a remote station housing.

The first remote station optical receiver is connected to the remote station triplex module via a second permanent link with a waveguide for receiving the third laser beam from the remote station triplex module. The advantage of having the remote station optical receiver outside of the remote station triplex module is that it provides flexibility to the device and the second permanent link with a waveguide ensures connectivity to the remote station triplex module without compromising on its functionality.

In an embodiment of the invention, the first wavelength is 808 nm or 940 nm, the second wavelength is 1310 nm and the third wavelength is 850 nm.

In yet another embodiment, the base station optical interface comprises a base station optical arrangement of devices and the remote station optical interface comprises a remote station optical arrangement of devices. Each of these devices is permeable to a selective wavelength. In other words, each device will only let a certain wavelength or bandwidth of light to pass through and will either reflect or refract the rest of the wavelengths of light. Hence the laser beams, having different wavelengths, incident on these devices are differently treated by the devices based on the permeable characteristic of the device.

The base station optical arrangement of devices comprises a first device permeable to the first laser beam and reflecting the third laser beam. The first device is arranged such that the first laser beam is coupled into the optical waveguide and the third laser beam from the optical waveguide is reflected towards the base station optical receiver. The base station optical arrangement of devices further comprises a second device permeable to the first and the third laser beam and reflecting the second laser beam, wherein the second device is arranged such that the first laser beam is coupled into the optical waveguide, the third laser beam passes through the second device towards the first device and the second laser beam is reflected and coupled into the optical waveguide.

The remote station optical arrangement of devices comprises a third device permeable to the first and the third laser beam and reflecting the second laser beam. The third device is arranged such that the first laser beam after passing through the third device is directed to a fourth device, the third laser beam is coupled into the optical waveguide and the second laser beam from the optical waveguide is reflected towards the second remote station optical receiver. The fourth device is permeable to the first laser beam and reflects the third laser beam. The fourth device is arranged such that the first laser beam is directed to the first remote station optical receiver and the third laser beam is reflected towards the third device.

This arrangement of devices ensures that the power is transmitted through the optical waveguide at a different wavelength without interfering with the data transmission which happens at another wavelength through the same optical waveguide. Also note that the data transmission from the base station to the remote station, i.e. uplink transmission, and the data transmission from the remote station to the base station, i.e. downlink transmission, happens at two distinct wavelengths.

In another embodiment each one of the devices from the base station as well as at the remote station optical arrangement of devices is a mirror, a filter or a lens. These mirrors or lenses act as filters for specific wavelengths. They are specially designed to allow only selective wavelengths of light to pass through and block the other wavelengths of light. This ensures that the laser beams are guided into and out of the optical waveguide and accurately fall on the corresponding receivers at the base and remote stations.

In an embodiment a type of ball lenses are used in combination with filters, corresponding to the used wavelength, for focusing the beams to the receivers via the fibre connector. The choice of lens, mirror or filter can depend on the available space inside the housing for the triplex modules.

The invention also discloses an embodiment of a method for simultaneous data and power transmission over an optical waveguide connecting a base station and a remote station. The method comprises the steps of generating a first laser beam having a first wavelength from a high power laser source at the base station, generating a second laser beam having a second wavelength from a low power laser source at the base station, coupling the first and the second laser beams into the optical waveguide. Thereafter the method comprises the steps of transmitting power on the first laser beam from the base station to the remote station via the optical waveguide and transmitting data on the second laser beam from the base station to the remote station via the optical waveguide.

The first laser beam carrying the power is then directed to a first remote station optical receiver and the second laser beam carrying the data is directed to a second remote station optical receiver. The transmitted power, carried by the first laser beam, is received from the base station at the first remote station optical receiver and the transmitted data, carried by the second laser beam, is received from the base station at the second remote station optical receiver.

The method further comprises the steps of generating a third laser beam having a third wavelength from a low power laser source at the remote station, coupling the third laser beam into the optical waveguide and transmitting data on the third laser beam from the remote station to the base station via the optical waveguide. Then the third laser beam is directed from the optical waveguide to a base station optical receiver where the data from the remote station is received at the base station optical receiver.

In this method the first, the second and the third wavelengths are distinct from each other. This prevents are crosstalk or interference between the data transmission and the power transmission.

In an embodiment of the method, the steps of transmitting power on the first laser beam from the base station to the remote station via the optical waveguide, the step of transmitting data on the second laser beam from the base station to the remote station via the optical waveguide and the step of transmitting data on the third laser beam from the remote station to the base station via the optical waveguide occur simultaneously. This results in a full-duplex data communication occurring simultaneously with power transmission, both happening independently of each other without any interference.

Additionally, the device for simultaneous data and power transmission over an optical waveguide can comprise some or all the features which have been mentioned above for the different embodiments of the device according to the invention.

The above-mentioned and other features of the invention will now be addressed with reference to the accompanying drawings of the present invention. The illustrated embodiments are intended to illustrate, but not limit the invention. The drawings contain the following figures, in which like numbers refer to like parts, throughout the description and drawings.

BRIEF DESCRIPTION OF THE SEVERAL VIEWS OF THE DRAWING

FIG. 3 is a flowchart depicting the method for simultaneous data and power transmission over an optical waveguide connecting a base station and a remote station.

DESCRIPTION OF THE INVENTION

Figure 1:
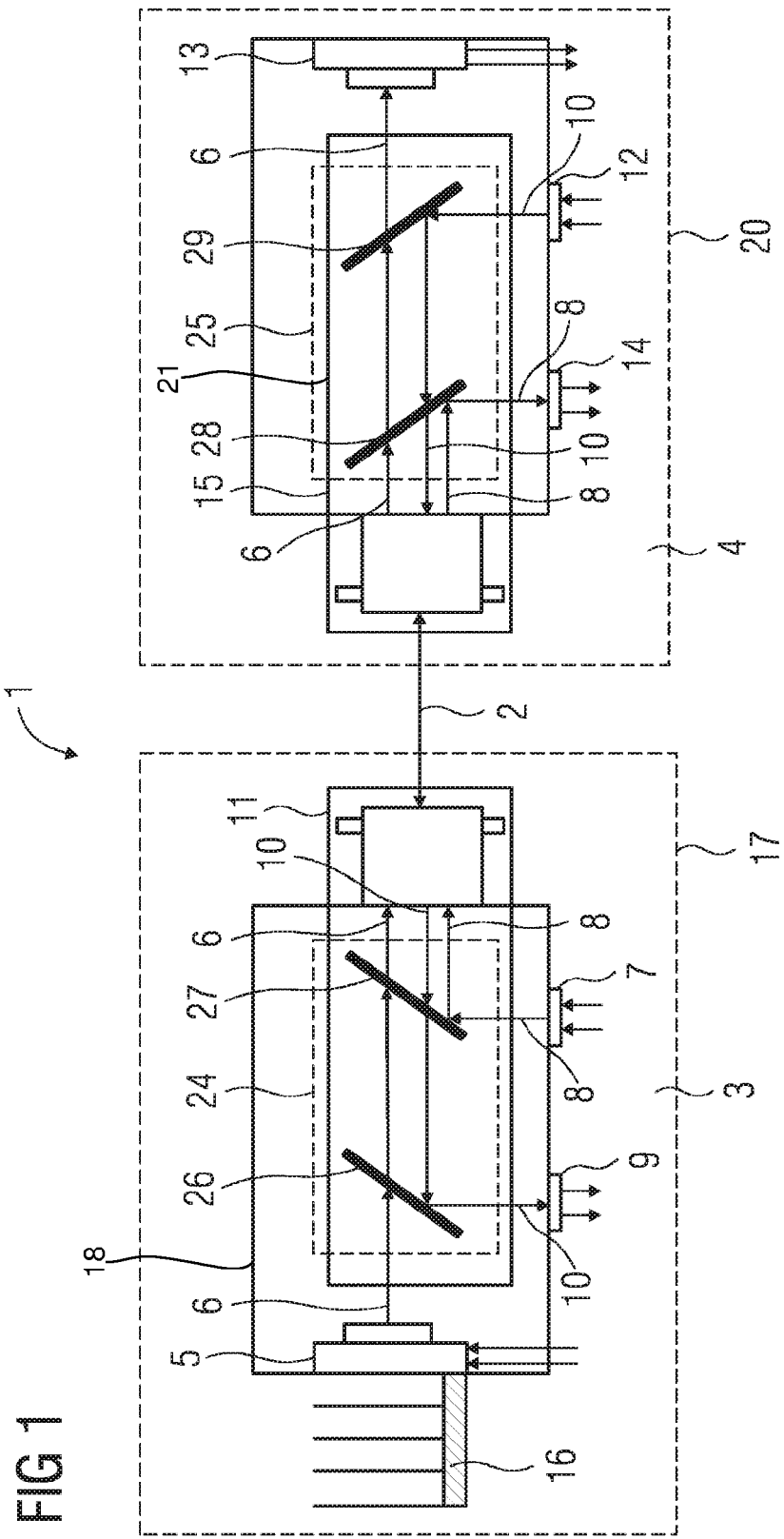
FIG. 1 is a schematic diagram of a device for simultaneous data and power transmission over an optical waveguide between a base station and a remote station.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 is a schematic diagram of a device 1 for simultaneous data and power transmission over an optical waveguide 2 between a base station 3 and a remote station 4. The base station 3 essentially comprises a high power laser source 5, a base station low power laser source 7, a base station optical arrangement of devices 24 comprising a first device 26 and a second device 27 and a base station optical receiver 9. The remote station 4 essentially comprises a remote station low power laser source 12, a remote station optical arrangement of devices 25 comprising a third device 28 and a fourth device 29, a first remote station optical receiver 13 and a second remote station optical receiver 14.

The high power laser source 5 at the base station 3 generates a first laser beam 6 having a certain wavelength. This first laser beam 6 passes through the first device 26 and the second device 27 and is then coupled into the optical waveguide 2 by a base station optical interface 11. This first laser beam 6 is then transmitted through the optical waveguide 2 and is directed to the first remote station optical receiver 13 by a remote station optical interface 15, after passing through the third 28 and the fourth 29 device. The third 28 and the fourth 29 devices are a part of the remote station optical arrangement of devices 25.

An example of the remote station optical receiver 13 is PPC6E, which is a photo voltaic power converter (PPC). This operates at wavelengths 808 nm or 940 nm. The PPC coverts the energy received from the first laser beam 6 into electrical energy. Using PPC-6E approximately 6 V and up to 500 mW energy can be produced. This electrical energy can be used for various applications as mentioned earlier.

The base station low power laser source 7 at the base station 3 generates a second laser beam 8 at a second wavelength. This second laser beam 8 gets reflected from the second device 27 and is then coupled into the optical waveguide 2 by the base station optical interface 11. This second laser beam 8 is then transmitted through the optical waveguide 2 and is directed to the second remote station optical receiver 14 by the remote station optical interface 15, after reflecting from the third 28 device. An example operating wavelength of the base station low power laser source 7 is 1310 nm.

Some features of a sample base station low power laser source 7 are that it is an un-cooled laser diode with Multi-QuantumWell (MQW) structure, operates in temperatures between −40° C. to +85° C. at 5 mW CW, thus it can operate at high temperatures without active cooling, it is a hermetically sealed active component, has built-in InGaAs monitor photodiode, complies with Telcordia (Bellcore) GR-468-CORE and TO-18 packaging with a flat window cap or a ball lens cap. An example of a second remote station optical receiver 14 is a high speed InGaAs detector operating at a wavelength of 1310 nm. This detector has high responsivity, high electrical bandwidth, fast response time, high reliability/hermetic package and has a 300 μm diameter active area.

The remote station low power laser source 12 at the remote station 4 generates a third laser beam 10 having a third wavelength. This third laser beam 10 is reflected from the fourth device 29, it passes through the third device 28 and is then coupled into the optical waveguide 2 by the remote station optical interface 15. This third laser beam 10 is then transmitted through the optical waveguide 2 and is directed to the base station optical receiver 9 by the base station optical interface 11, after passing through the second 27 and reflecting from the first 26 device. An example operating wavelength of the remote station low power laser source 12 is 850 nm.

An example of the second remote station optical receiver 14 is a photodiode operating at 850 nm, like a GaAs photodetector with a low noise trans-impedance amplifier. This photodiode has a large active area of 250 μm, a high bandwidth or a wide dynamic range, is hermetically sealed in TO-46 Can, works with a single 3.3 V to 5 V power supply and provides differential Output.

An example of the remote station low power laser source 12 at the remote station 4 operating at 850 nm is a single Mode Vertical Cavity Surface Emitting Laser (VCSEL) emitter. Some features the VCSEL Emitter is that it operates in Single-mode & single-polarization, it provides ideal circular Gaussian beam, has stable polarization, has TO-46 flat window cap and has built-in electro-static discharge (ESD) protection structure.

The optical receivers 9, 14 and transmitters 7, 12 for data transmission are working at different wavelengths. Basically several combinations are possible within the whole range of available optical components. Generally all wavelengths, for example, starting from 650 nm up to 1550 nm are possible.

This applies also for the high power laser source 5 and the first remote station optical receiver 13 which are available for different wavelengths.

FIG. 1 illustrates the integrated version of the device. The integrated version has a base station housing 17 which comprises the base station low power laser source 7, the base station optical receiver 9, the base station optical interface 11 and the high power laser source 5. This base station housing 17 can also form a base station triplex module 18. There is a heat sink 16 connected to the high power laser source 5 for dissipating heat from the high power laser source 5. The heat sink 16 is accommodated inside the base station triplex module 18 or the base station housing 17.

In this version of the base station triplex module 18 the corresponding remote station 4 also has an integrated structure wherein the remote station low power laser source 12, the remote station optical interface 15, the first remote station optical receiver 13 and the second remote station optical receiver 14 are arranged inside a remote station housing 20. This remote station housing 20 can also form a remote station triplex module 21.

Hence FIG. 1 is illustrating an embodiment where essentially the high power laser source 5 and mainly the first remote station optical receiver 13 or the photovoltaic power converter (PPC) form a part of the base station 18 and the remote station 21 triplex module respectively.

Compared with the state of the art duplex modules this integrated version of the base station triplex module 18 design will require a larger housing for the base station housing 17 since the power dissipation of the high power laser source 5 will heat up the base station triplex module 18 so that a proper heat sink 16 design has to be considered.

In contrast to the base station triplex module 18 the remote station triplex module 21 has only a low power dissipation since the first remote station optical receiver 13 or the PPC is providing only little electrical energy, for example about 100 mW. This doesn't require any heat sink so that the remote station triplex module 21 and its housing 20 has to be enlarged, compared with the state of the art duplex module, just enough to hold the additional first remote station optical receiver 13 or the PPC.

Figure 2:
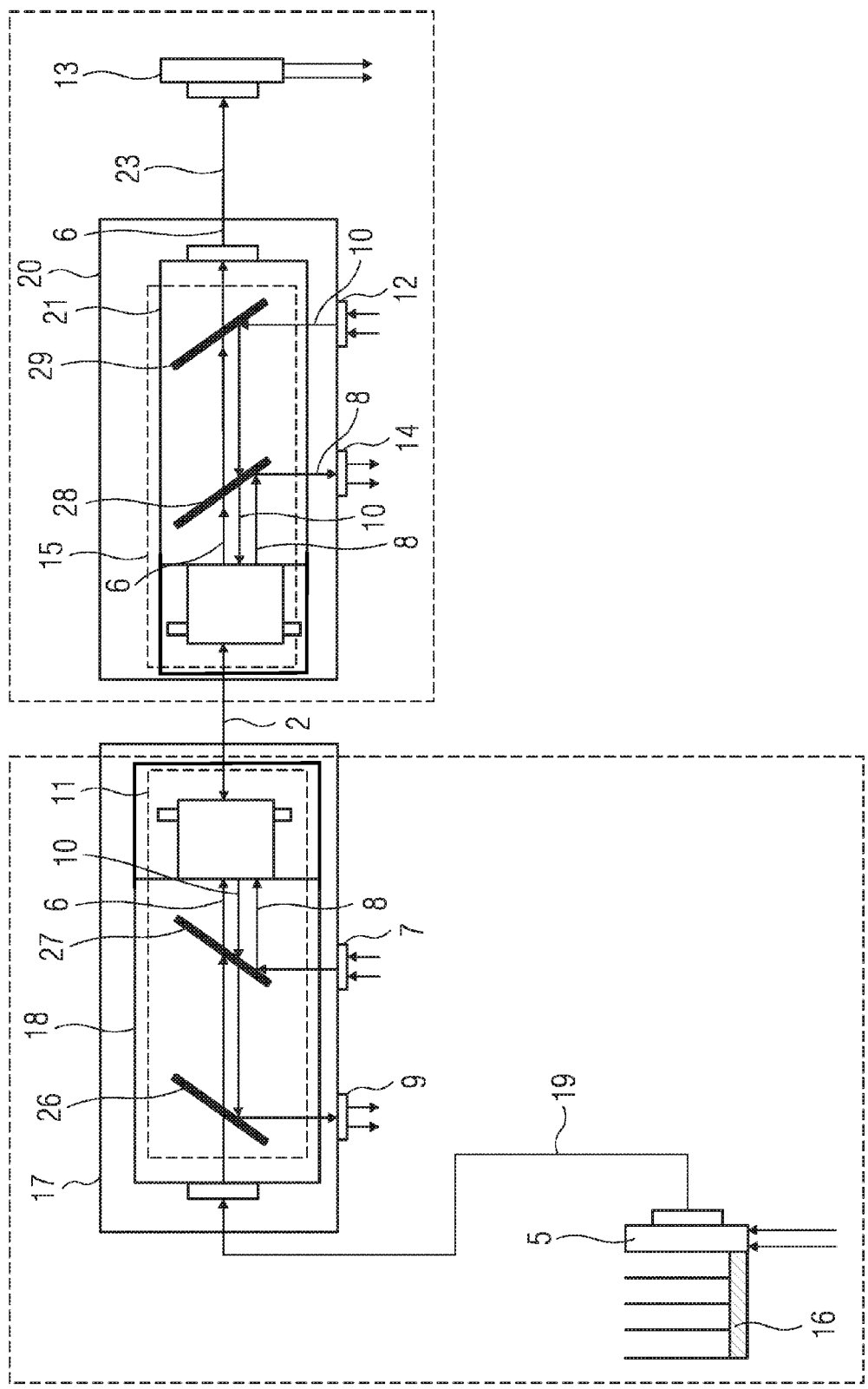
FIG. 2 is a schematic diagram of another embodiment of the device where the high power laser source and the first remote station optical receiver are connected to the base and the remote station respectively via permanent links with waveguides.

Referring now to FIG. 2, it illustrates another embodiment of the device for simultaneous data and power transmission over an optical waveguide 2 between a base station 3 and a remote station 4 where the high power laser source 5 and the first remote station optical receiver 13 are connected to the base and the remote station respectively via permanent links with waveguides 19, 23. The high power laser source 5 and the first remote station optical receiver 13 are manufactured as separate units.

At the base station 3, the base station low power laser source 7, the base station optical interface 11 and the base station optical receiver 9 together form a base station triplex module 18 arranged inside a base station housing 17. This base station triplex module 18 is connected to the high power laser source 5 via a first permanent link with a waveguide 19. This waveguide 19 can be a fibre pigtail, a single, short, optical fibre. This waveguide 19 or fibre pigtail feeds the first laser beam 6 from the high power laser source 5 into the base station triplex module 18.

Similarly for the remote station, the remote station low power laser source 12, the remote station optical interface 15 and the second remote station optical receiver 14 together form a remote station triplex module 21 arranged inside a remote station housing 20. This remote station triplex module 21 is connected to the first remote station optical receiver 13 via a second permanent link with a waveguide 23. This waveguide 23 can be a fibre pigtail, a single, short, optical fibre. This waveguide 23 or fibre pigtail feeds the first laser beam 6 from the remote station triplex module 21 into the first remote station optical receiver 13.

This mechanical design of manufacturing the high power laser source 5 and the first remote station optical receiver 13 as separate units and connecting to the base station triplex module 18 and the remote station triplex module 21 respectively via pigtail fibres might be easier to realize than the integrated version as illustrated in FIG. 1. The base station housing 17 and the remote station housing 20 will be more compact as compared with the integrated version of FIG. 1 as the base station triplex module 18 of the integrated version will become more bulky due to the size of the heat sink 16 connected to the high power laser source 5.

It is also imaginable to use a mixed design. For example the 'Pigtail-Version' of FIG. 2 for base station 3 and the 'Integrated-Version' of FIG. 1 for the remote station 4 or vice versa.

Referring now to FIG. 3, a flowchart depicting a method 100 for simultaneous data and power transmission over an optical waveguide 2 connecting a base station 3 and a remote station 4 is illustrated. The flowchart shows a step 101 of generating a first laser beam 6 having a first wavelength from a high power laser source 5 at the base station 3, a step 102 of generating a second laser beam 8 having a second wavelength from a base station low power laser source 7 at the base station 3, a step 103 of coupling the first 6 and the second 8 laser beams into the optical waveguide 2, a step 104 of transmitting power on the first laser beam 6 from the base station 3 to the remote station 4 via the optical waveguide 2, a step 105 of transmitting data on the second laser beam 8 from the base station 3 to the remote station 4 via the optical waveguide 2, a step 106 of directing the first laser beam 6 to a first remote station optical receiver 13 and directing the second laser beam 8 to a second remote station optical receiver 14, a step 107 of receiving the power from the base station 3 at the first remote station optical receiver 13, a step 108 of receiving the data from the base station 3 at the second remote station optical receiver 14, a step 109 of generating a third laser beam 10 having a third wavelength from a remote station low power laser source 12 at the remote station 4, a step 110 of coupling the third laser beam 10 into the optical waveguide 2, a step 111 of transmitting data on the third laser beam 10 from the remote station 4 to the base station 3 via the optical waveguide 2, a step 112 of directing the third laser beam 10 from the optical waveguide 2 to a base station optical receiver 9 and finally a step 113 of receiving the data from the remote station 4 at the base station optical receiver 9, wherein the first, the second and the third wavelengths are distinct from each other.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

LIST OF REFERENCE SIGNS 1 system
2 optical waveguide
3 base station
4 remote station
5 high power laser source
6 first laser beam
7 base station low power laser source
8 second laser beam
9 base station optical receiver
10 third laser beam
11 base station optical interface
12 remote station low power laser source
13 first remote station optical receiver
14 second remote station optical receiver
15 remote station optical interface
16 heat sink
17 base station housing
18 base station triplex module
19 first permanent link with a waveguide
20 remote station housing
21 remote station triplex module
23 second permanent link with a waveguide
24 base station optical arrangement of devices
25 remote station optical arrangement of devices
26 first device
27 second device
28 third device
29 fourth device

The invention claimed is:

1. A device for simultaneous data and power transmission, the device comprising:
a base station, a remote station and an optical waveguide connected between said base station and said remote station;
said base station including:
a high power laser source for emitting a first laser beam at a first wavelength, wherein the first laser beam is used for power transmission from said base station to said remote station;
a base station low power laser source for emitting a second laser beam at a second wavelength, wherein the second laser beam is used for data transmission from said base station to said remote station;
a base station optical receiver for receiving a third laser beam at a third wavelength from said remote station, wherein the third laser beam is used for data transmission from said remote station to said base station;
a base station optical interface for simultaneously coupling the first and second laser beams into said optical waveguide and for directing the third laser beam from said optical waveguide to said base station optical receiver;
said remote station including:
a remote station low power laser source for generating the third laser beam for data transmission from said remote station to said base station;
a first remote station optical receiver for receiving the first laser beam from said base station;
a second remote station optical receiver for receiving the second laser beam from said base station;
a remote station optical interface for simultaneously directing the first laser beam to said first remote station optical receiver, the second laser beam to said second remote station optical receiver, and for coupling the third laser beam into said optical waveguide; and
wherein the first wavelength, the second wavelength, and the third wavelength are distinct from one another, and wherein:
said base station optical interface comprises a base station optical arrangement of devices and said remote station optical interface comprises a remote station optical arrangement of devices wherein each device is permeable to a selective wavelength, and wherein:
said base station optical arrangement of devices comprises:
a first device permeable to the first laser beam and reflecting the third laser beam, wherein said first device is arranged to cause the first laser beam to be coupled into said optical waveguide and the third laser beam from said optical waveguide to be reflected towards said base station optical receiver;
a second device permeable to the first and third laser beams and reflecting the second laser beam, wherein said second device is arranged to cause the first laser beam to be coupled into said optical waveguide, the third laser beam to pass through said second device towards said first device and the second laser beam to be reflected and coupled into said optical waveguide; and
said remote station optical arrangement of devices comprises:
a third device permeable to the first and third laser beams and reflecting the second laser beam, wherein the third device is arranged to cause the first laser beam, after passing through said third device, to be directed to a fourth device, the third laser beam to be coupled into said optical waveguide and the second laser beam from said optical waveguide to be reflected towards said second remote station optical receiver;
the fourth device permeable to the first laser beam and reflecting the third laser beam, wherein said fourth device is arranged to cause the first laser beam to be directed to said first remote station optical receiver and the third laser beam to be reflected towards said third device.

2. The device according to claim 1, wherein said first remote station optical receiver comprises a photovoltaic power converter for converting the power received from the first laser beam into electrical energy.

3. The device according to claim 1, wherein said base station optical receiver, said first remote station optical receiver and said second remote station optical receiver are photodiodes.

4. The device according to claim 1, wherein one or both of said base station low power laser source and said remote station low power laser source for generating the third laser beam is a vertical-cavity surface-emitting laser.

5. The device according to claim 1, which comprises a heat sink connected to said high power laser source for dissipating heat from said high power laser source.

6. The device according to claim 1, which comprises a base station housing, wherein said base station low power laser source, said base station optical receiver, said base station optical interface and said high power laser source are arranged inside said base station housing.

7. The device according to claim 1, wherein said base station low power laser source, said base station optical interface and said base station optical receiver together form a base station triplex module arranged inside a base station housing, and said high power laser source is connected to said base station triplex module via a first permanent link with a waveguide for feeding the first laser beam into said base station triplex module.

8. The device according to claim 1, which comprises a remote station housing, wherein said remote station low power laser source, said remote station optical interface, said first remote station optical receiver and said second remote station optical receiver are arranged inside said remote station housing.

9. The device according to claim 1, wherein said remote station low power laser source, said remote station optical interface and said second remote station optical receiver together form a remote station triplex module arranged inside a remote station housing, and said first remote station optical receiver is connected to said remote station triplex module via a second permanent link with a waveguide for feeding the first laser beam into said remote station triplex module.

10. The device according to claim 1, wherein the first wavelength is 808 nm or 940 nm, the second wavelength is 1310 nm and the third wavelength is 850 nm.

11. The device according to claim 1, wherein each one of said devices is selected from the group consisting of a mirror, a filter, and a lens.

12. A method for simultaneous data and power transmission over an optical waveguide connecting a base station and a remote station, the method comprising:
providing the base station with an optical interface having a base station optical arrangement of devices and providing the remote station with an optical interface having a remote station optical arrangement of devices, with each device being permeable to a selective wavelength;
generating a first laser beam having a first wavelength with a high power laser source at the base station;
generating a second laser beam having a second wavelength with a base station low power laser source at the base station;
coupling the first and second laser beams into the optical waveguide;
transmitting power on the first laser beam from the base station to the remote station via the optical waveguide;
transmitting data on the second laser beam from the base station to the remote station via the optical waveguide;
directing the first laser beam to a first remote station optical receiver and directing the second laser beam to a second remote station optical receiver;
receiving the power from the base station at the first remote station optical receiver;
receiving the data from the base station at the second remote station optical receiver;
generating a third laser beam having a third wavelength with a remote station low power laser source at the remote station;
coupling the third laser beam into the optical waveguide;
transmitting data on the third laser beam from the remote station to the base station via the optical waveguide;
directing the third laser beam from the optical waveguide to a base station optical receiver;
receiving the data from the remote station at the base station optical receiver;
wherein the first wavelength, the second wavelength and the third wavelength are distinct from each other;
wherein:
the base station optical arrangement of devices includes:
a first device permeable to the first laser beam and reflecting the third laser beam, wherein the first device is arranged to cause the first laser beam to be coupled into the optical waveguide and the third laser beam from the optical waveguide to be reflected towards the base station optical receiver;
a second device permeable to the first and third laser beams and reflecting the second laser beam, wherein the second device is arranged to cause the first laser beam to be coupled into the optical waveguide, the third laser beam to pass through the second device towards the first device and the second laser beam to be reflected and coupled into the optical waveguide; and
the remote station optical arrangement of devices comprises:
a third device permeable to the first and third laser beams and reflecting the second laser beam, wherein the third device is arranged to cause the first laser beam, after passing through the third device, to be directed to a fourth device, the third laser beam to be coupled into the optical waveguide and the second laser beam from the optical waveguide to be reflected towards the second remote station optical receiver;
the fourth device permeable to the first laser beam and reflecting the third laser beam, wherein the fourth device is arranged to cause the first laser beam to be directed to the first remote station optical receiver and the third laser beam to be reflected towards the third device.

13. The method according to claim 12, which comprises simultaneously carrying out the step of transmitting power on the first laser beam from the base station to the remote station via the optical waveguide, the step of transmitting data on the second laser beam from the base station to the remote station via the optical waveguide and the step of transmitting data on the third laser beam from the remote station to the base station via the optical waveguide.

* * * * *